Feb. 27, 1951  E. J. DUNHAM  2,543,690
LIFT TRUCK FRAME SELECTIVELY MOUNTING EITHER
A GAS ENGINE OR AN ELECTRIC MOTOR FOR
POWERING THE DRIVE WHEELS THEREOF
Filed Sept. 13, 1945  10 Sheets-Sheet 2

Inventor
Elmer J. Dunham.

Inventor:
Elmer J. Dunham.

Feb. 27, 1951 E. J. DUNHAM 2,543,690
LIFT TRUCK FRAME SELECTIVELY MOUNTING EITHER
A GAS ENGINE OR AN ELECTRIC MOTOR FOR
POWERING THE DRIVE WHEELS THEREOF
Filed Sept. 13, 1945 10 Sheets-Sheet 7

Inventor:
Elmer J. Dunham
By Mauryee... Boettcher Dunn
Attys.

Feb. 27, 1951     E. J. DUNHAM     2,543,690
LIFT TRUCK FRAME SELECTIVELY MOUNTING EITHER
A GAS ENGINE OR AN ELECTRIC MOTOR FOR
POWERING THE DRIVE WHEELS THEREOF
Filed Sept. 13, 1945     10 Sheets-Sheet 8

Inventor:
Elmer J. Dunham

Feb. 27, 1951 E. J. DUNHAM 2,543,690
LIFT TRUCK FRAME SELECTIVELY MOUNTING EITHER
A GAS ENGINE OR AN ELECTRIC MOTOR FOR
POWERING THE DRIVE WHEELS THEREOF
Filed Sept. 13, 1945 10 Sheets-Sheet 9

Inventor:
Elmer J. Dunham

Patented Feb. 27, 1951

2,543,690

UNITED STATES PATENT OFFICE 2,543,690

LIFT TRUCK FRAME SELECTIVELY MOUNTING EITHER A GAS ENGINE OR AN ELECTRIC MOTOR FOR POWERING THE DRIVE WHEELS THEREOF

Elmer J. Dunham, Battle Creek, Mich., assignor to Clark Equipment Company, Buchanan, Mich., a corporation of Michigan Application September 13, 1945, Serial No. 616,091

10 Claims. (Cl. 180—54)

My present invention relates to improvements in self-propelled lift trucks of the type used for lifting and transporting goods and materials in warehouses, factories, wharves, and the like.

Trucks of this type are provided either with an electric motor means or an internal combustion engine means for propulsion purposes. Many factors enter into the selection of one or the other of such propulsion means for lift trucks, and in certain instances the electric motor propulsion type is desired for quietness of operation and avoidance of exhaust gases incident to the operation of an internal combustion engine as the motive power source. On the other hand the internal combustion engine type may be desired to eliminate the necessity of re-charging of batteries of the electric motor propulsion type or when frequent heavy loads are to be handled.

Heretofore these two types of lift trucks have been designed to utilize either one or the other of the aforementioned power plants so that in the manufacture of such trucks separate dies, tools, etc. are required for each in its production. This is highly objectionable from a manufacturing cost standpoint in that in order to meet the requirements of customers desiring either the electric motor propulsion type or internal combustion engine propulsion type two complete and independent lift trucks have had to be produced by the manufacturer.

It is an object of my invention to overcome to a substantial extent the necessity of providing dual die and tooling equipment, etc. for the production of lift trucks of the above mentioned different types.

A further object of my invention is to provide a lift truck of the self-propulsion type which is so constructed and arranged that either one of two types of power plants may be selectively incorporated in the lift truck as desired.

I propose to accomplish the above objects by providing a main lift truck assembly with which either an electric motor means or an internal combustion engine means and necessary associated apparatus for the operation of each may be readily incorporated to provide a selected power plant for the lift truck.

The lift trucks of my invention are readily adapted to have either one of two types of power plants associated therewith by providing a main frame means which is originally constructed to provide readily for the support of either of the aforesaid types of power plant, as desired. The lift trucks, except for the power plant and the controls necessary for the operation of each, are identical and after a particular type of power plant has been selected construction of the vehicle may be readily completed by the assembly therein of the selected power plant. Thus the lift trucks may be substantially entirely completed and assembled prior to knowledge of the type of power plant to be incorporated in a particular truck. By virtue of my invention all parts, other than the power plant and associated controls therefor, of either type of powered truck are identical so that the same dies, tools, etc. for such parts of the trucks may be used in the construction and assembly thereof, which results in a substantial saving in manufacturing cost and yet readily provides for the production of a lift truck with the desired power plant.

A preferred feature of my invention is to provide a self-propelled lift truck having driving mechanism through which the driving wheels are driven and in which a main frame means is provided which is adapted to have selectively associated therewith means for supporting an internal combustion engine propulsion means or an electric motor propulsion means.

A further preferred feature of my invention resides in the provision of a main frame means for supporting a suitable driving mechanism, such as a differential, and through which the drive wheels for the lift truck are driven, and in which the main frame means and drive mechanism are so formed to provide for the selective association therewith of an internal combustion engine propulsion means or an electric motor propulsion means.

A still further preferred feature of my invention is in the provision of a lift truck as aforesaid in which the main frame is provided with means for the selective association therewith of different forms of lift platform frame supporting members.

Other objects, features and advantages of my invention will appear from the detail description.

Now, in order to acquaint those skilled in the art with the manner of constructing and utilizing lift trucks in accordance with my invention, I shall describe in connection with the accompanying drawings certain preferred embodiments of my invention.

Figure 1:
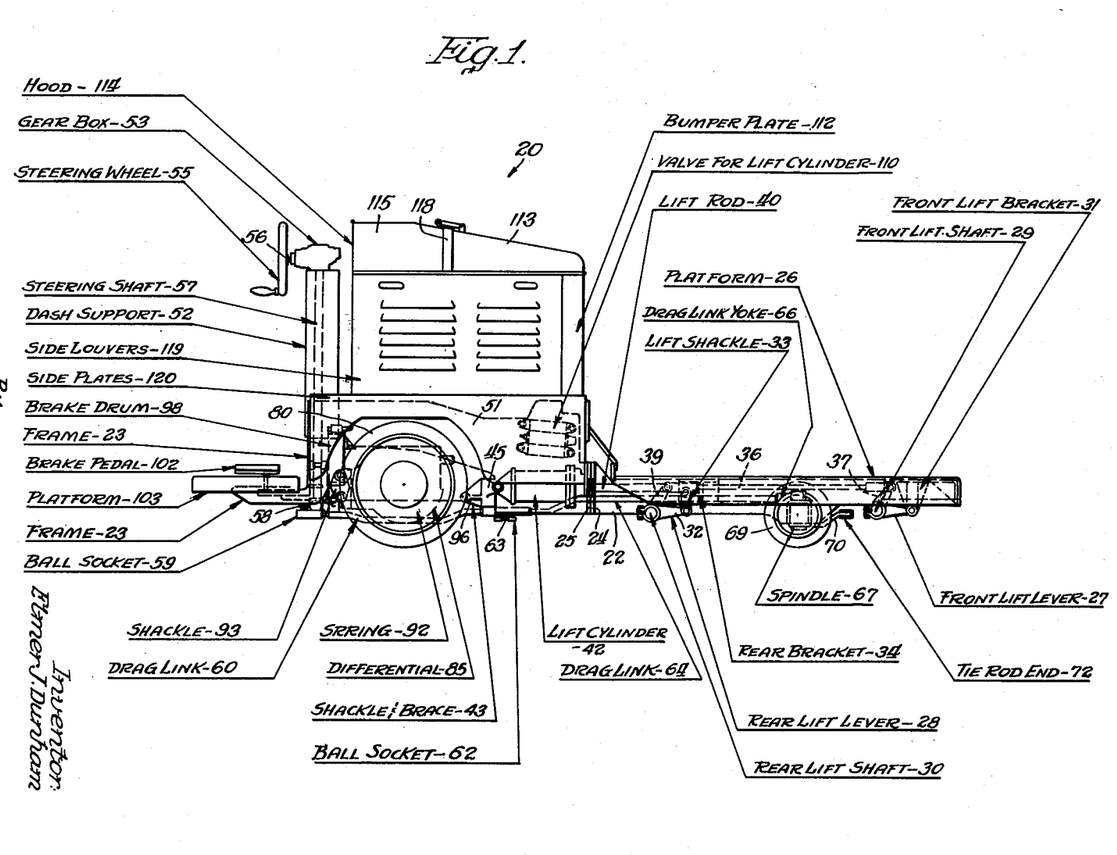
Figure 1 is a side elevational view of a lift truck constructed in accordance with my invention which is complete except for the incorporation of a power plant therein, controls therefor, and a dashboard assembly for a selected power plant, and with which presently known forms of either an internal combusion engine means or an electric motor means may be assembled to provide a source of motive power for the lift truck.
Figure 2:
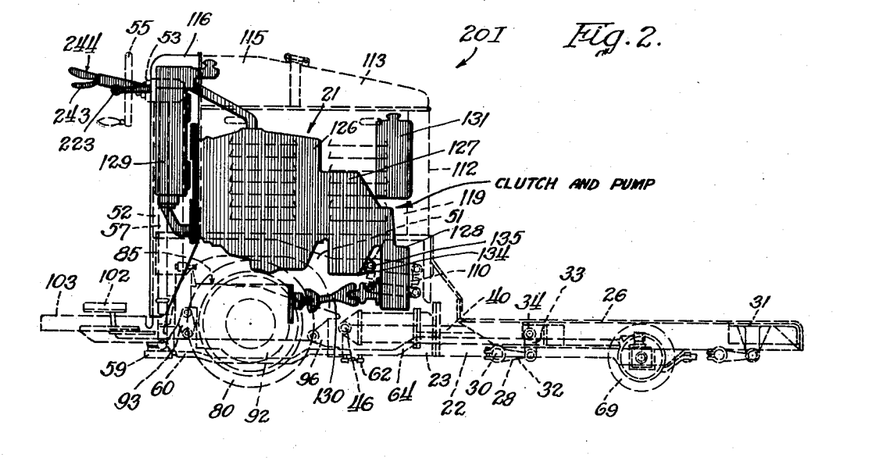
Figure 2 is a side elevational view of the lift truck in Figure 1 in which an internal combustion engine type of power plant has been incorporated, and in which the added parts are indicated by the shaded areas.
Figure 3:
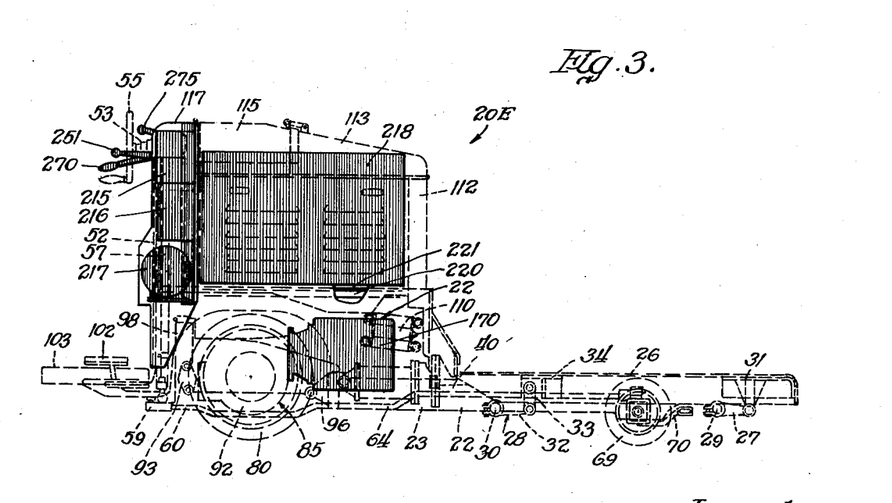
Figure 3 is a side elevational view of the lift truck in Figure 1 in which an electric motor type of power plant or propulsion means has been incorporated, and in which the added parts are indicated by the shaded areas.
Figure 8:
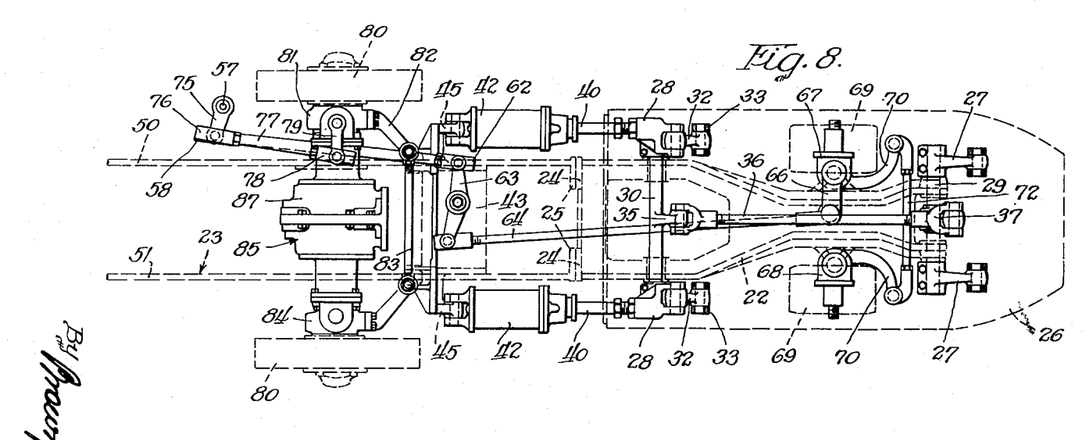
Figures 8 and 8A are more or less diagrammatic plan and side elevational views, respectively, of the steering and platform lifting mechanisms of the lift trucks of Figures 1 through 3.
Figure 8A:
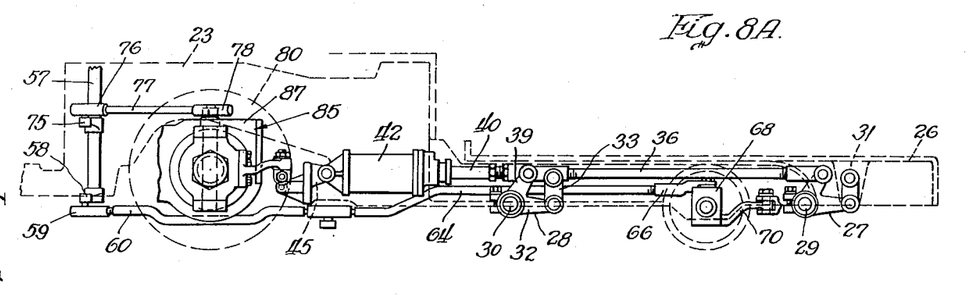

Referring now in detail to the drawings I have shown in Figure 1 a lift truck 20 complete except for a power plant, controls for the power plant, and appropriate dash panel assembly, with which an internal combustion engine means 21 and associated apparatus may be incorporated, as shown in Figure 2, to provide the completed lift truck 20I of the latter figure, or with which, as shown in Figure 3, an electric motor means 22 and associated apparatus may be incorporated to provide the second form of completed lift truck 20E of the latter figure. The parts common to lift trucks 20I and 20E are shown in Figure 1, and it will be observed that the apparatus shown in Figures 1 and 8 comprises a load platform frame 22 and a main or rear frame assembly 23, shown in detail in Figures 9 through 11, which are each provided with a pair of pads 24—24 and 25—25 at their rearward and forward ends, respectively, for securing them together lengthwise. A load platform 26 is mounted over the platform frame 22 and as shown in Figures 8 and 8A is adapted to be raised and lowered by front and rear lift levers 27—27 and 28—28 respectively, connected to front and rear lift shafts 29 and 30 journaled in and extending transversely of the platform frame 22 adjacent the forward and rearward ends thereof.

The front lift levers 27—27 have connection with a front lift bracket 31 suitably secured to the under surface of the platform 26 adjacent the forward end thereof, and the arms 32—32 of the rear lift levers 28—28 have connection with lift shackles 33—33, which in turn are pivotally connected to a rear lift bracket 34 secured to the under surface of the platform 26 adjacent the rearward end thereof. A lever 35 is secured to the rear lift shaft 30 substantially centrally thereof the free end of which has pivotal connection with a rod 36 extending lengthwise and forwardly of the platform frame and has connection at its forward end with a lever 37 fixed to the front lift shaft 29 substantially centrally thereof. The rear lift levers 28—28 are provided with arm members 39—39 which are pivotally connected to lift rods 40, the other ends of which are connected to pistons disposed in the pair of lift cylinders 42—42 disposed at either side of the rear or main frame 23 adjacent the forward end thereof. As shown more clearly in Figure 9, the rear or main frame 23 comprises a transversely extending bracing member or bracket 43 having a pair of lugs 45—45 to which the rearward ends of lift cylinders 42 are mounted as by pins. It will thus be observed that the lift rods 40—40 may be caused to be reciprocated by controlling flow of fluid under pressure to the lift cylinders 42—42 to effect raising and lowering of platform 26 with respect to the platform frame 22.

The platform lift mechanism generally described above is conventional in the art and represents one suitable form of such mechanism suitable for use in practicising my present invention. It will be understood, however, that for purposes of my invention the platform lift mechanism may follow other known arrangements of such parts.

Figures 9, 10, 11:
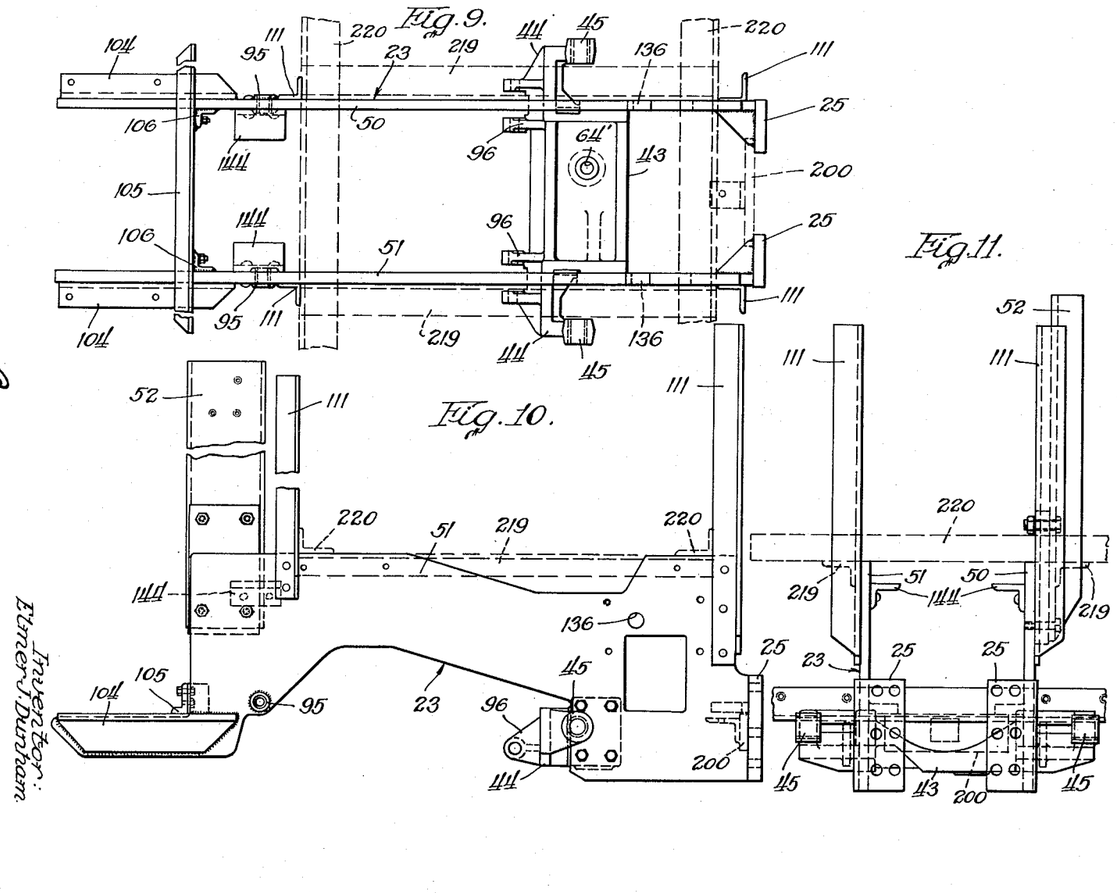
Figure 9 is a plan view of the main frame assembly of the lift trucks shown in Figures 1 through 5 with certain of the brackets thereof shown in dotted lines being added to the frame when the lift truck is to be electrically driven as for example the lift trucks of Figures 3 and 5.
Figure 10 is a side elevational view of the main frame assembly of Figure 9.
Figure 11 is an end view of the main frame assembly shown in Figures 9 and 10.

Also, a conventional form of steering means is provided for the lift trucks, and it may, for example, follow the construction disclosed in my prior Patent No. 2,197,926, dated April 23, 1940. The preferred arrangement of the several parts providing for steering of the lift trucks are shown in Figures 1, and 8 through 11. As shown in Figure 9, the frame 23 comprises a pair of spaced lengthwise extending side walls 50 and 51 in which the side wall member 50 as shown in Figure 10, adjacent its rearward end, has suitably secured thereto as by a plurality of bolts and nuts a vertically extending dash support bracket 52. The upper end of the dash support bracket 52 provides for the support in a known manner of a conventional gear box 53. A steering wheel 55 is mounted for rotation about a horizontal axis on a shaft 56 which extends into the gear box 53 to effect rotation of a steering shaft 57 extending vertically downwardly from the gear box 53 to the lower end of which a steering shaft lever 58 is secured having connection through a ball and socket means 59 with a drag link 60 extending generally forwardly of the vehicle. The drag link 60 at its other end has a ball and socket connection 62 with one end of a lever 63 pivoted intermediate its ends about a vertical axis on a pin carried in an opening 64' (see Figure 9) of the bracing member or bracket 43 of the main or rear frame 23. The other end of the lever 63 has a ball and socket connection with one end of a second drag link 64 which at its other end is provided with a drag link yoke 66 having connection with a spindle member 67 of a pair of spindle members 67 and 68 for rotatably supporting a pair of forward wheels 69 at either side of the platform frame in a known manner. A pair of crank arms 70 are associated with the spindle members 67 and 68 which are connected by a tie rod 72 so that the pair of wheels 69 are steered together in the same direction upon actuation of the steering wheel 55. As shown more clearly in Figure 8A, the steering shaft 57, upwardly of its lower end, has a lever 75 secured thereto which lever has a ball and socket connection 76 to a drag link 77 which in turn has a ball and socket connection 78 to a crank arm 79 associated with a spindle member 81 for one of the pair of driving wheels 80—80 of the lift truck. The spindle member 81 is provided with a crank arm 82 which is connected by a tie rod 83 to the crank arm of a spindle member 84 for the other driving wheel 80 to provide for conjoint turning of the driving wheels. The above described drag link connections of the pair of forward wheels 69—69 carried by the platform frame 22 and the drag link connections of the driving wheels 80—80, operating off of the common steering shaft 57 by means of the hand wheel 55, provide a four-wheel truck in which all the wheels are effective in steering of the lift truck by reason of which the vehicle may be turned in a relatively small radius.

Figure 12:
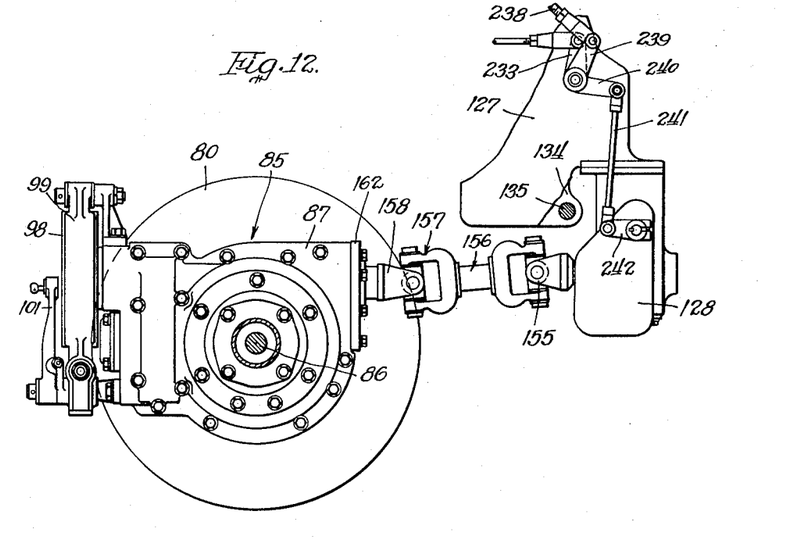
Figure 12 is a side elevational view of a differential housing having suitable known driving mechanism through which the drive wheels of the lift trucks of my invention are adapted to be driven and showing a portion of the clutch housing and transmission means, and the drive shaft between the transmission means and differential mechanism.
Figure 13:
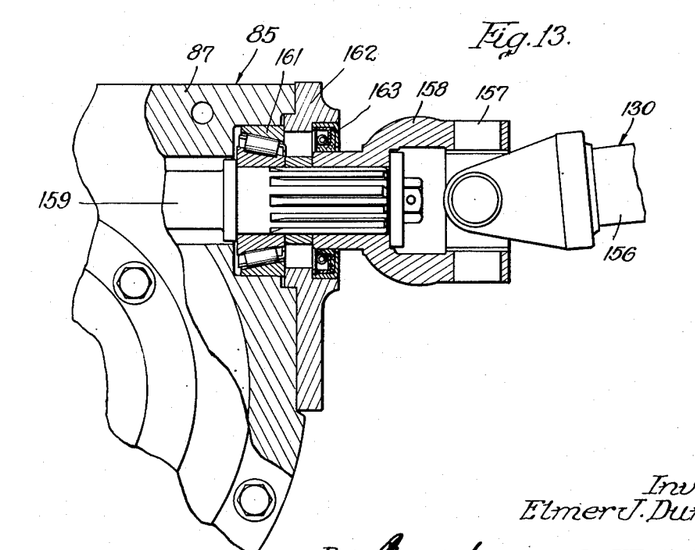
Figure 13 is an enlarged side view of a portion of the differential housing shown partly in section and illustrating the manner in which the transmission of the internal combustion engine means has connection with the differential mechanism.

A driving mechanism preferably comprising a differential 85 of known construction for driving the drive wheels 80—80 is mounted to lie between the side walls 50 and 51 of the main or rear frame 23 toward the rearward end thereof. It will be observed from Figure 12 that a drive axle 86 extends laterally outwardly from one side of the differential housing 87, to one of the drive wheels 80, it being understood that a like drive axle extends laterally outwardly of the other side of differential housing 87 to the other drive wheel 80 and which drive axles are connected in the conventional manner to drive the drive wheels 80—80 of the lift truck. The mounting of the differential housing in the lift truck is of conventional construction to the extent that it includes a pair of leaf springs 92 at either side of the vehicle which have connection at their rearward ends to shackles 93 the upper ends of which are pivotally mounted in bearing elements 95—95 provided therefor in the side walls 50 and 51 of the main frame 23. The other ends of the springs 92 are received in the yoke-shaped shackle members 96—96 formed as part of the bracing member or bracket 43 and extending rearwardly of the main frame 23. The bracing member 43 thus not only serves to secure rigidly the side walls 50 and 51 of the frame in spaced relation, but also provides, by means of the shackle members 96 thereof for the support of the forwardly extending ends of leaf springs 92. As is known in the art suitable U-shaped bolts 97 (see Figure 14) are provided to encircle the leaf springs 92 with the vertically extending arms of the U-shaped bolts passing through the differential housing and suitably secured by nuts threaded on the free ends of the arms to the housing. It will be understood that any other suitable mounting of the differential 85 may be provided in practicing my invention, and it is believed that a further description of the mounting of such mechanism in the lift truck is not necessary for an understanding of my invention. The differential mechanism may, for example, be that of the type shown in my above referred to patent which comprises a brake drum 98 fixed on the end of the propeller shaft of the differential and with which suitable brake band members 99 are associated. A crank arm 101 is carried by a shaft suitably connected to and adapted to be rotated by the brake pedal 102 disposed in a position to be engaged by the foot of an operator standing upon the platform 103 for engaging and disengaging the brake bands with the brake drum. The platform 103 is supported by rearwardly extending reduced ends of the side walls 50 and 51, which are provided with angle iron members 104 suitably secured to and extending along the outer sides thereof, and an angle iron 105 extending transversely of the main frame 23 which is suitably secured thereto by a pair of angle brackets 106.

The side wall frame member 51 adjacent its forward and upper edge carries a control valve 110 which is connected by suitable conduits (not shown) to the lift cylinders 42 to admit fluid under pressure thereto for controlling raising and lowering the platform 26. The valve 110 is of a known type and the connections thereof to the lift cylinders 42 is also well known in view of which it is believed that a further description thereof is not necessary for the purposes of my present invention. The controls for control valve 110 will be referred to hereinafter.

Figure 6:
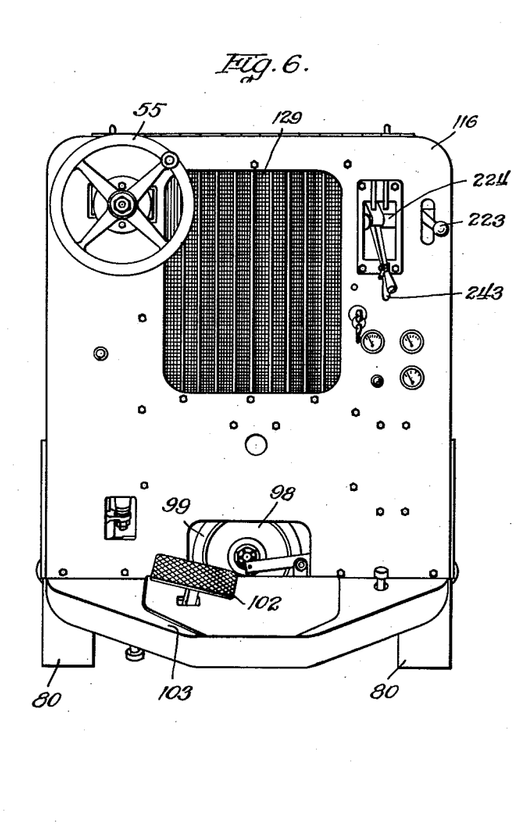
Figure 6 is an end elevational view of a lift truck having an internal combustion engine means as the source of motive power, as for example, the lift trucks shown in Figures 2 and 4.
Figure 7:
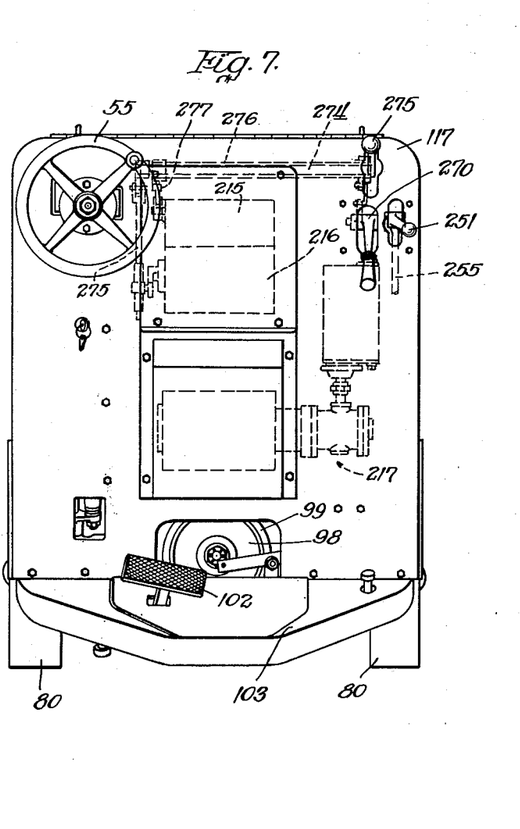
Figure 7 is an end elevational view of a lift truck having an electric motor means as a source of motive power, as for example, the lift trucks shown in Figures 3 and 5.

As shown in Figures 9 to 11, the frame 23 is provided with four upwardly extending angle iron posts 111 with the pair of angle iron posts 111 at the forward end of the main frame 23 providing for the mounting of bumper plate 112 upon which one section 113 of a hood 114 is hingedly mounted by a transversely extending hinge at the forward edge of the section 113. Hood 114 comprises a second section 115 which at its rearward uppermost edge is adapted to be hingedly mounted to either of the dashboard panels 116 and 117 shown in Figures 6 and 7, respectively. A clamp 118 is provided for clamping the open ends of the adjacent sections 113 to 115 to each other when in the closed position, as shown in Figure 1 of the drawings. Suitable removable side plates or panels 119 having louvers formed therein complete the enclosure formed by the bumper plate 112, and the hinged top hood sections 113 and 115, and either of the dashboard panels 116 and 117. It will be observed from Figures 2 and 3 that the dashboard panels 116 and 117 enclose the steering bracket 52, a portion of the gear box 53 and steering shaft 57 so that substantially only the steering wheel 55 of the steering mechanism extends beyond the outer face of either dashboard panel. A pair of side plates 120 complete the elements common to either type of powered lift truck which side plates extend downwardly from the removable side louvers substantially in vertical alignment therewith and provide a finished appearance for the truck.

Figure 16:
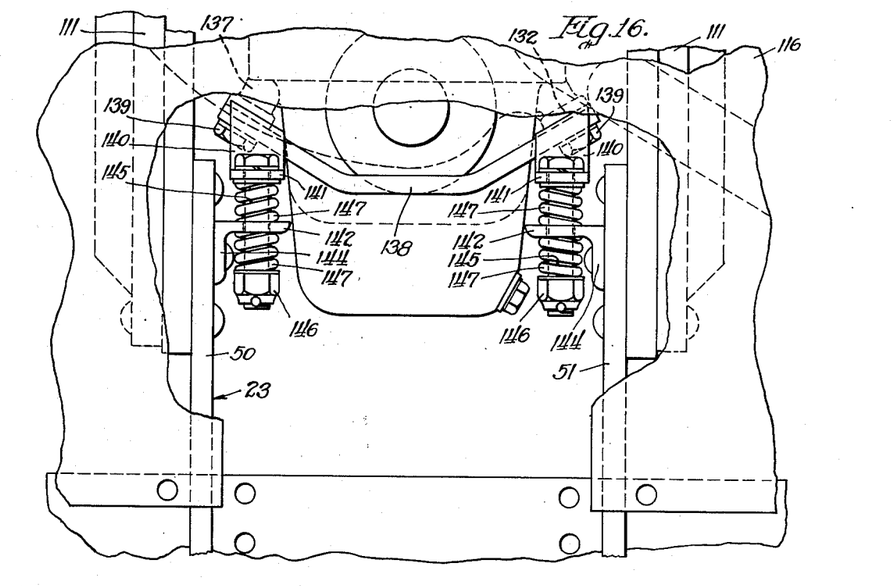
Figure 16 is a partial end elevational view looking toward the dashboard panel of the lift truck of Figures 2 and 4, and illustrating the manner in which the forward end of the internal combustion engine is adapted to be mounted in a lift truck.

Reference may now be had to Figures 9 through 11, 12, 13, and 16 for a description of the manner in which an internal combustion engine propulsion type of power plant may be incorporated in the assembly of parts of Figures 1 to provide the lift truck 20I of Figure 2. As shown in Figure 2 the internal combustion engine type of propulsion means comprises an internal combustion engine 126, a clutch 127 with which clutch a pump for supplying fluid under pressure for raising and lowering load supporting platform 26 is carried and adapted to be driven in a manner well known in the art, a transmission 128 associated with the clutch 127, a cooling radiator 129, and a drive shaft connection 130 from the transmission 128 to the differential 85. A gasoline tank 131 which may be supported by suitable brackets (not shown) on the internal combustion engine means is also provided for storing gasoline for the internal combustion engine 126. It will be understood that various other devices such as carburetor, air cleaner, fuel and water circulating pumps and appropriate hose connections and the like are associated with the internal combustion engine propulsion means, as is well known in the art. As will be clear from Figures 2, 9 and 16, the several elements making up the internal combustion engine propulsion type means of my invention are enclosed within the hood formed by hinged top sections 113 and 115, the end bumper plate 112, the side louver panels 119, the dashboard panel member 116 of Figure 6 and between the side wall frame members 50 and 51. The hinged cover sections 113 and 115 may be swung open which together with the removable side louver panels 110, render the internal combustion engine means readily available for inspection, repair and servicing. The pair of rearwardly disposed angle iron posts 111 are provided for supporting the radiator within the dash panel member 116. The transmission 128 is of conventional construction and in the embodiment of the invention herein disclosed is of a type providing one gear ratio for forward drive and one gear ratio for reverse drive in which the selection of forward or reverse drive is under control of the operator by control mechanism to be hereinafter referred to. The clutch 127 is also of a known construction, and the connection thereof with the internal combustion engine and of the transmission 128 to the latter is a known arrangement to in effect form a single unit thereof. The housing of clutch 127 is formed at its lower rearward end with an integral boss 134 having a transverse bore through which a rod 135 extends transversely of the main frame 23 with the opposite ends of the rod being supported in openings 136 formed in the side walls thereof, as shown in Figure 10, to provide a pivotal mounting of the rearward end of the internal combustion engine means. The forward end of the internal combustion engine 126 which extends toward the rear of the lift truck 20I, as shown in Figure 16, is provided with a pair of pads 137 to which a frame member 138 extending transversely of the forward end of the internal combustion engine 126 is suitably secured as by bolts 139. A pair of angle iron brackets 140 are welded to the outer ends of bracket member 138, with the flanges 141 thereof extending horizontally rearwardly and disposed vertically above the horizontally inwardly extending flanges 142 of a pair of angle iron brackets 144 suitably secured to the side wall members 50 and 51 of main frame 23. The flanges 141 and 142 of the angle brackets 138 and 144 are provided with suitable openings through which bolts 145 extend vertically with the lower ends of the bolts 145 each having a nut 146 threaded thereon. A pair of coil springs 147 are associated with each of the bolts 145 with one of the coil springs of each being disposed between the flanges 141 and 142 and the other of the coil springs between the flange 142 and the nut 146. The coil springs are adapted to be placed under compression by threading of the nuts 146 on the bolts 145 to provide a resilient mounting of the forward end of the internal combustion engine. It will be understood that other suitable means such as rubber blocks or the like may be utilized to provide a resilient mounting of the forward end of the internal combustion engine in the main frame 23 in lieu of the springs 145. With the internal combustion engine means mounted in the lift truck 20I of Figure 2, as described, it will be observed from Figures 12 and 13 that the drive shaft from the transmission unit 128 has connection by means of the universal joint 155 with the drive shaft 156 of the driving connection 130 between the transmission and the differential 85. The other end of the drive shaft 156 has connection with the propeller shaft 159 of the differential 85 through a universal joint 157 which comprises a yoke member 158 splined to the propeller shaft. As shown the propeller shaft 159 adjacent its forward end is supported in a roller bearing assembly 161 in a recess provided therefor in the differential housing 87 and a cover plate 162 and an oil seal 163 are provided to close the opening in the differential housing through which the propeller shaft 159 extends.

Figure 14:
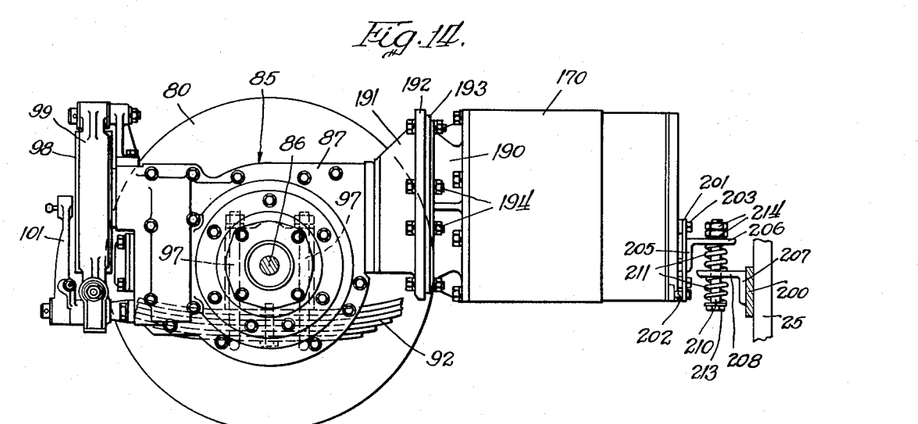
Figure 14 is a side elevational view of the differential housing of the lift trucks of my invention, and showing the manner in which an electric motor is mounted thereto, which electric motor provides the source of motive power for the lift trucks of the type shown in Figures 3 and 5.
Figure 15:
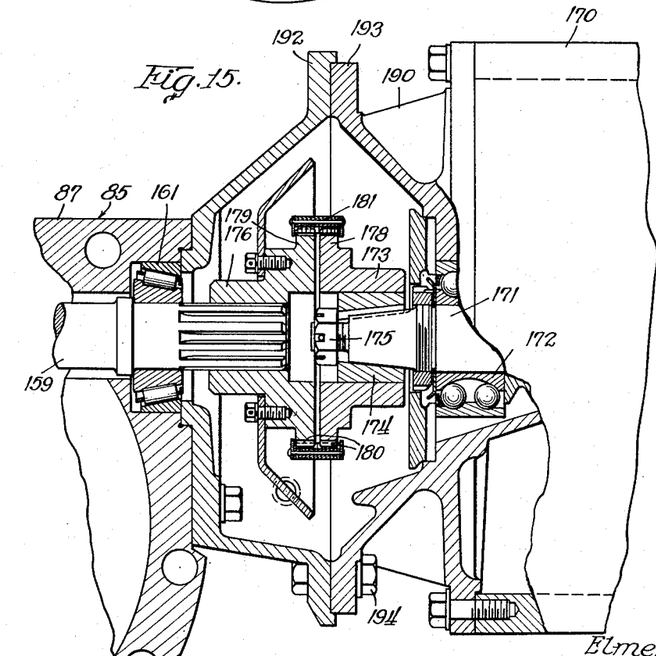
Figure 15 is an enlarged detail vertical sectional view through a portion of the differential housing shown in Figure 13, and showing in section the means by which the armature shaft of the electric motor has driving connection with the propeller shaft of the differential.
Figure 17:
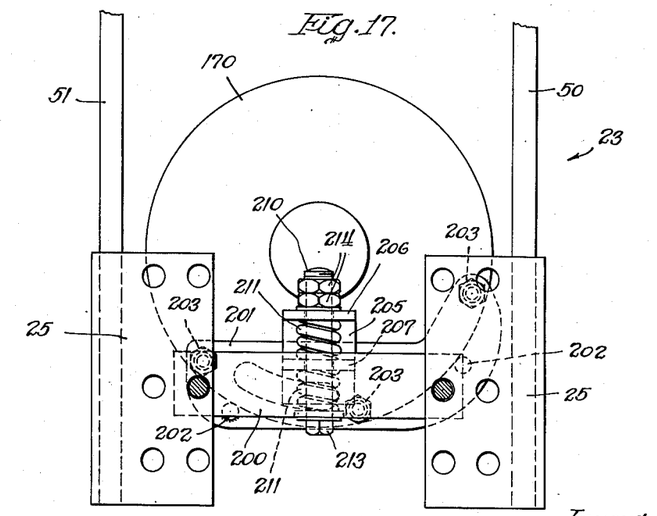
Figure 17 is an elevational view illustrating the manner in which the end of the electric motor opposite the end connected to the differential housing is mounted in the main frame assembly of the lift trucks.

Reference may now be had to Figures 9 to 11, 14, 15 and 17 for a description of the manner in which the electric motor propulsion means is incorporated with the assembly of parts shown in Figure 1 to provide the electrically driven lift truck of Figure 3 of the drawings. As will be clear from Figures 14 and 15, it will be seen that the cover plate 162, oil seal 163, and universal yoke member 158 of the universal joint 157 previously referred to in connection with Figures 12 and 13 are eliminated in the incorporation of an electric motor 170 with the differential 85. As shown in Figure 15 the electric motor 170 comprises an armature shaft 171 which is journaled in the ball bearing race 172 at the rearward end of the motor, and the outer end of the armature shaft has secured thereto a collar or sleeve member 173 by means of a wedge 174 keyed to the armature shaft and against which a nut 175 having threaded engagement with the threaded end of the armature shaft is adapted to bear. A sleeve 176 similar to the sleeve 173 is mounted on the splined end of the propeller shaft 159 of the differential 85. Each of the collar or sleeve members 173 and 176 are provided with outwardly radially extending flanges 178 and 179, respectively, which are provided with teeth 180 about which an endless chain 181 is trained so that the armature shaft is adapted to drive the propeller shaft 159 of the differential mechanism 85. A first housing section 190 is connected by bolts to the rearward end of the housing of electric motor 170, and a second housing section 191 is provided with a peripheral flange 192 which is suitably secured to the flange 193 of the housing section 190 as by a plurality of bolts and nuts 194. The opposite end of the housing section 191 is formed to be piloted in the recess at the open end of the differential housing 87 to enclose the flexible coupling between the armature shaft of the motor and the propeller shaft of the differential. It will be observed that the rearward end of the housing section 191 is of the same form as the inner face of the closure plate 162 of Figure 13, so that the housing 87 of the differential is adapted to have associated therewith either the electric motor driving means or the internal combustion engine propulsion means in the lift trucks of my invention. The forward end of the electric motor 170, as shown in Figures 14 and 17, is adapted to be supported between the side walls 50 and 51 by means of a frame or bar member 200 (shown in dotted lines in Figures 9 and 10), the opposite ends of which are suitably secured to the pads 25 at the forward end of the main frame 23. A plate member 201 is secured forwardly of the electric motor 170 at the lower portion thereof by a pair of pins 202, welded to the plate 201, which extend inwardly toward the motor and engage the outer periphery of the forward end coverplate of the electric motor housing. A plurality of spacer screws 203 have threaded engagement with the forward end cover plate and secure the plate 201 in spaced relation thereto with the pins 202 serving to prevent shearing of the spacer screws, and the spacing of the plate member 201 providing for circulation of air to cool the electric motor. An angle bracket 205 is secured to the frame member 201 as by welding and is provided with a horizontal forwardly extending flange element 206. An angle bracket 207 is also secured to the bar or frame member 200 extending transversely between the pads 25 of the frame 23 and has a flange portion 208 extending horizontally inwardly and underlying the flange 206 of the bracket 205. A bolt 210 extends through openings formed in the flanges 206 and 208 of the brackets 205 and 207 with one of a pair of coil springs 211 being disposed between the flanges 206 and 208 and the other coil spring being disposed between the headed end 213 of the bolt and flange 208. A pair of nuts 214 are threaded on the bolt 210 to maintain the pair of springs 211 under compression and provide a resilient mounting for the forward end of the electric motor 170. Thus, in the mounting of an electric motor in the assembly of parts shown in Figure 1 of the drawings, it will be observed that it is only necessary to incorporate with the main frame 23 a transversely extending frame member, such as the member 200, and suitably secure it to the main frame 23 as on the pads 25—25 in which the frame member is provided with a bracket adapted to support a resilient mounting means associated with an electric motor. As shown in Figure 3, a control box 215, a contactor box 216, a pump means 217 and storage batteries 218 comprise auxiliary apparatus to effect operation of the electric motor 170 for driving the truck and raising and lowering of the platform 26. The construction and operation of these several elements are of a character well known in the art and form no part of the present invention. However, the several elements referred to, except for the storage batteries 218, are all contained within the dashboard panel 117 shown in Figures 7 and 19.

The storage batteries 218, as will be seen more clearly from Figures 3, and 9 through 11, are adapted to be supported above the upper edges of side walls 50 and 51 of the main frame and within the enclosure formed thereabove by hood sections 113 and 115, bumper plate 112 and dash panel 117, by means of a pair of lengthwise extending angle members 219, shown in dotted lines in Figures 9 and 10, which are suitably secured to the outside surfaces of the side walls 50 and 51 at the upper edges thereof. A second pair of forward and rearward angle members 220, also shown in dotted lines in Figures 9 and 10, extend transversely of side walls 50 and 51 and are suitably secured to angle brackets 219 with the forward and rearward angle members 220 bearing against the forward and rearward pairs of vertical post forming angle members 111, respectively. A base plate member 221 mounted on the angle members 219 and 220 provides for the support of the storage batteries 218. It will thus be observed that in the electric powered lift truck of Figure 3 that the main frame 23 is adapted to have suitable angle members and a base plate associated therewith for the support of storage batteries providing a source of electricity for operation of the electric motor 170 for driving the lift truck and of the motor for the pump means 217 for effecting raising and lowering of the platform 26. It will also be observed that the electric motor 170 is disposed between side walls 50 and 51 and below the upper edges thereof so that ample space is provided for the support of the storage batteries in the compartment defined by the hood sections 113 and 115, side louver panels 119, bumper plate 112 and the dash panel member 117, above the upper edges of side frames 50 and 51.

Figures 18, 19:
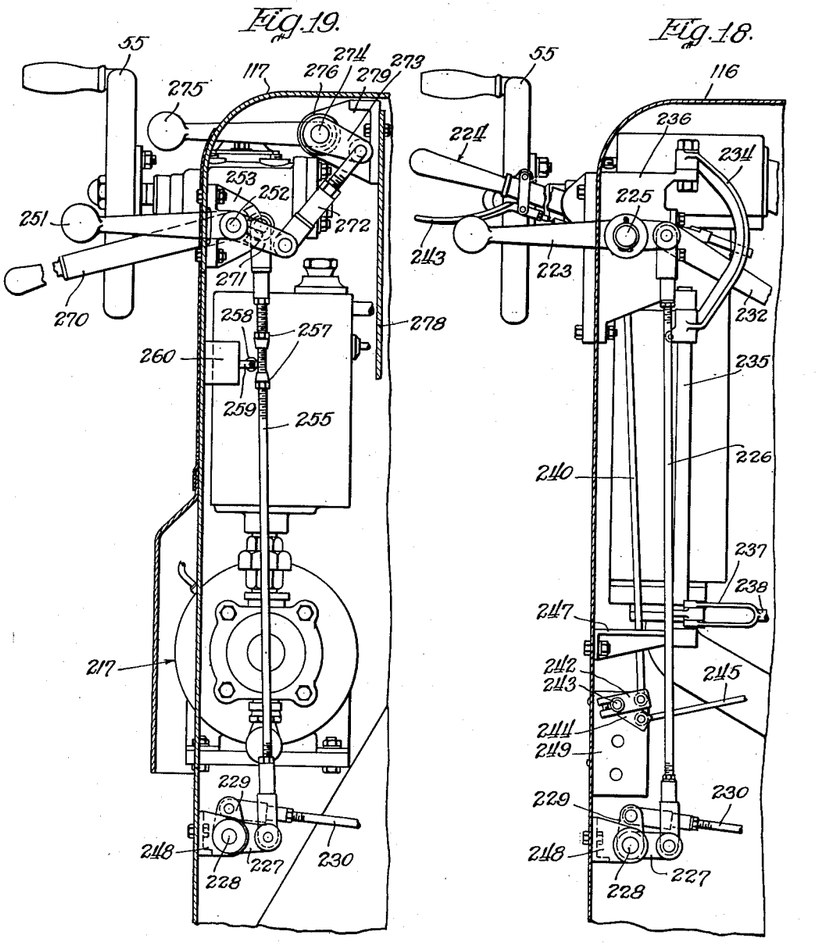
Figure 18 is a side elevational view of the several controls incorporated in the lift truck when it is provided with an internal combustion engine type of power plant as in the lift trucks of Figures 2 and 4.
Figures 19 is a side elevational view of the several controls incorporated in the lift truck when an electric motor is utilized as the source of motive power as in the lift trucks of Figures 3 and 5.

Reference may now be had to Figure 18 in which the controls for the internal combustion engine propulsion type of lift truck of Figure 2 are shown. These controls are similar in most respects to the controls shown and described in my above referred to patent to which reference may be had. In general these controls comprise a lift control lever 223 which extends outwardly through an opening formed in the dash panel 116 (see Figure 6) which when raised vertically from the neutral position shown to its upper position effects actuation of valve 110 to lower lift platform 26, and when moved vertically through neutral to its lowermost position effects raising of the platform. A main clutch and gear shift control lever is shown at 224. The lift control lever 223 is pivoted intermediate its ends about a horizontal axis as at 225 for the aforesaid vertical movement, and the inner end thereof has pivotal connection with the upper end of a substantially vertically extending rod 226 which at its lower end has pivotal connection with an arm 227 connected by means of a shaft 228 with an arm 229 from which a rod 230 extends to the valve 110 for effecting admission of fluid under pressure to the lift cylinders 42 to effect raising and lowering the platform. It will be understood, as is common in the art, that the internal combustion engine drives a suitable pump associated with and having driving connection with clutch 127 for supplying fluid under pressure to the lift cylinders 42 through the valve 110 in the raising and lowering of platform 26 under the control of the operator by means of the platform control lever 223.

The clutch and gear shift lever 224 comprises a clutch lever 232 which has suitable connection with a rock arm 233 (see Figure 12) for effecting engagement and disengagement of clutch 127 by vertical movement of lever 224. The arrangement is such that when lever 224 is in its uppermost position the clutch 127 is engaged and when the lever 224 is in its lowermost position the clutch is disengaged. The lever 224 is also adapted to have sidewise movement in its lowermost position, which sidewise movement by means of an arcuate segment member 234 carried by a bracket 236 fixed to panel member 116 effects rotary movement of a vertically extending shaft 235. A yoke 237 is mounted on the lower end of shaft 235 from which a rod 238 extends to a bell crank 239 pivoted on the clutch housing. The arm 240 of bell crank 239 has connection through a rod 241 with the rock arm 242 extending into the transmission 128. As is well known in the art the lever 224 is movable for selectively actuating the transmission for forward or reverse drive. In the instant application the transmission is of a character providing single forward and reverse gear ratios. This may be varied to provide a plurality of gear ratios as desired and may, for example, incorporate the transmission of my above patent. Thus sidewise movement of the lever 224 in its lowermost position provides for selection of either forward or reverse drive and then upon movement of the lever 224 substantially vertically upwardly, the clutch is engaged whereby the driving wheels 80 are driven by the internal combustion through the transmission 128 and differential 85 by the connection thereof, as previously described. A throttle lever 243 is pivoted on the lever 224 and has connection with a rod 240 connected at its lower end to a lever 242 fixed to a shaft 243 to which a second lever 244 is secured and from which one end of which a throttle control rod 245 extends to a carburetor for controlling the speed of the internal combustion engine. A bracket 247 mounted on panel 116 provides for support of the lower end of shaft 235 and brackets 248 and 249, also secured to the panel 116, provide for support of the shafts 228 and 243 of the lift valve actuating linkage and throttle control mechanism, respectively. It is believed that further description of the controls for the internal combustion engine propelled type of lift truck of my invention is not necessary for they are well known in the art and so far as my present invention is concerned may vary widely.

Reference may now be had to Figure 19 for a general description of the several controls for the electric motor propulsion type of lift truck shown in Figure 3. A platform lift control lever 251 extends through a suitable opening formed in the upper end of the dash panel 117 (see Figure 7) which lever is pivoted about a horizontal pivot 252 suitably supported on the bracket 253 carried at the inner surface of and toward the upper end of the rear wall of the panel 117. The inner end of the lever 251 has suitable connection with a substantially vertically extending rod 255 the lower end of which has pivotal connection by the arrangement of parts previously described and comprising the arm 227 connected to a horizontally disposed shaft 228 to which is fixed the lever 229 and from which the rod 230 extends to the valve means 110. It will thus be observed that the platform lift control lever means for the valve 110 for effecting lowering and raising of the lift platform 26 in both types of lift trucks of my invention are substantially identical except that in the electric motor propulsion type, as shown in Figure 19, the rod 255 adjacent the upper end thereof is provided with a threaded portion upon which a pair of nuts 257 are threaded in spaced relation with the opposed inner ends of the nuts 257 being tapered for engaging a roller 258 carried by an arm 259 of a pump motor switch 260. Thus upon raising and lowering of the platform control lever 251 either of the tapered surfaces of the nuts 257 engage the roller 258 to force the switch arm 259 inwardly and close the switch 260 to effect operation of the motor of the pump means 217, which is suitably connected to the valve 110 to provide a source of fluid under pressure for the lift cylinder 42—42 in the raising and lowering of the platform 26.

A speed control lever 270 is pivoted about the pin 252 providing for pivotal mounting of the platform control lever 251 and has its arm 271 pivotally connected to an adjustable link 272 which in turn has pivotal connection to a lever 273 mounted on a shaft 274 extending transversely of the upper end of the panel 117, the other end of the shaft 274 having a lever 275 mounted thereon which has connection through suitable known mechanism with the contactor box 216 having rheostat means for controlling the speed of the electric motor 170. A direction control lever 275 extends through a suitable opening provided therefor in the panel 117, and at its inner end has connection to a hollow shaft 276 extending coaxially of the shaft 274 and through linkage 277 at its other end has connection with the polarity reversing means of control box 215 to provide for rotating the armature shaft of the electric motor in either direction for selection of either forward or reverse drive for the lift truck. As previously related the control box 215, the contactor box 216, the pump means 217 and its connection with the valve 110, are all common expedients in the art and is believed that further description thereof is not necessary to an understanding of my instant invention. It will be seen in Figure 19 that a panel 278 encloses the upper end of dash panel 117 housing the upper ends of the several control levers and mechanism above described which panel 278 is suitably secured to the pair of rearward upright posts 111 extending vertically upwardly from the main frame 23. The panel 278 provides for support of a bracket 279 to which the shafts 274 and 273 for the levers 270 and 275 are mounted. It will be understood that the electrical control levers and mechanisms may vary widely since any suitable electrical control means for establishing the circuit between the batteries and the electric motor as well as the pump means for supplying fluid under pressure to the valve 110 may be utilized for purposes of my present invention.

Figure 4:
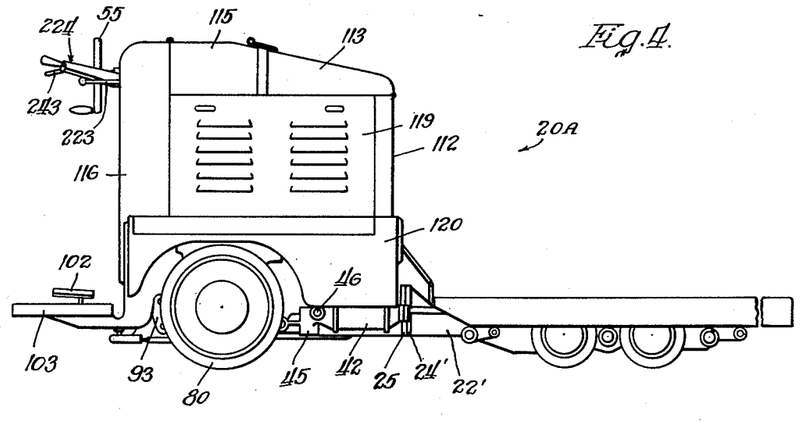
Figure 4 is a side elevational view of another form of lift truck with which my present invention may be incorporated, the lift truck shown being provided with an internal combustion engine type of power plant.

In Figure 4 I have shown a lift truck of the type comprising a lift platform supporting means comprising four wheels and in which the lift truck is provided with an internal combustion engine type of propulsion means. In this form of lift truck all wheels are adapted to be used in steering and may, for example, follow the steering mechanism of my above identified patent. My invention thus has utility in application to other trucks in that the pads 24' of frame 22' of the lift truck 20A, shown in Figure 4, are adapted to be secured to the pads 25 of the main frame 23 to provide this lift truck. In all other respects the truck 20A is similar to the lift truck of Figure 2 except for the different form of platform frame 22' and steering mechanism for the wheels thereof.

Figure 5:
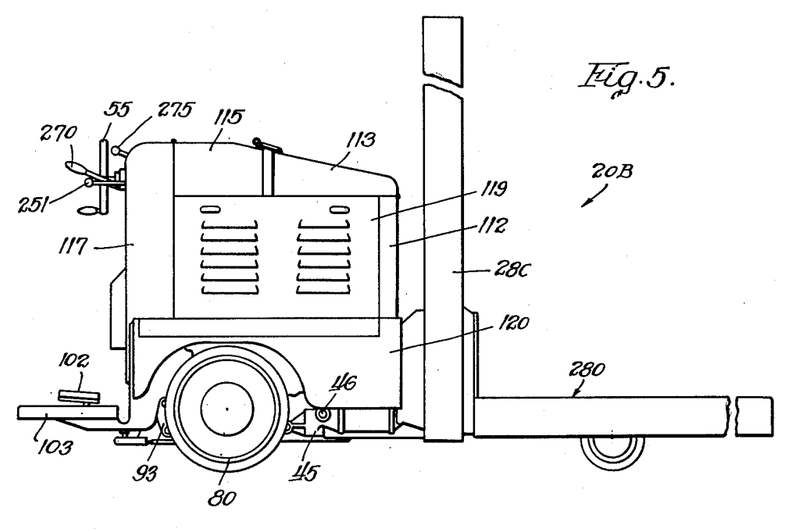
Figure 5 is a side elevational view of still another form of lift truck in which my present invention has been embodied, the lift truck shown being provided with an electric motor type of power plant as the propulsion means.

Also, in Figure 5 I have shown still another form of lift truck 20B which has a lift platform 280 adapted to be raised and lowered by suitable hydraulic lift mechanism. The propulsion means may be either of the electric or internal combustion engine type hereinbefore described and in the embodiment shown the electrical propulsion means described more particularly in connection with Figure 3 has been incorporated in the main frame of the truck. Here again the different form of platform elevating means is carried by a platform frame adapted to have connection with the pads 25—25 of the main frame 23 of the lift truck previously described.

While I have shown what I consider to be the preferred embodiments of my invention it will be understood that various rearrangements and modifications may be made therein without departing from the spirit and scope of the invention.

I claim:

1. In a self-propelled industrial truck having driving wheels and adapted to be provided selectively with either an internal combustion engine means or an electric motor means for driving said driving wheels, a main frame member comprising a pair of spaced vertical side walls, differential means including a housing and having a pair of driving axles, means including said main frame member for supporting said differential means between said side walls with said axles extending transversely of one end of said frame for carrying said driving wheels, said internal combustion engine means and said electric motor means being adapted to have supporting means associated therewith, and said electric motor means including means for mounting the same onto the housing of said differential means, and means for said main frame adapted to cooperate with said supporting means of said internal combustion engine means and said electric motor means for mounting the same selectively between the side walls of said frame member.

2. An industrial truck having driving wheels and adapted to be provided selectively with either an internal combustion engine means or electric motor means for driving said driving wheels, comprising a main frame, differential means including a housing supported by said frame and having driving connection with said driving wheels, said main frame comprising a pair of spaced side walls having opposed openings therein adapted to support a rod to extend transversely of the frame to provide a support for one end of said internal combustion engine means, said side walls of said frame member being adapted to support bracket means for supporting the other end of said internal combustion engine means, said frame member being formed to provide for the association therewith of bracket means for supporting one end of said electric motor means, and the housing of said differential means being formed to provide for the support of the other end of said electric motor means.

3. In an industrial truck having differential means including a housing and driving wheels adapted to be driven through said differential means and which said truck is adapted to be selectively provided for driving said differential means with either an internal combustion engine means having supporting bracket means at one end thereof and in which a supporting bar is provided to extend transversely of the other end thereof, or an electric motor means comprising a housing member adapted to be supported at one end by the housing of said differential means and bracket means at the other end of said electric motor means for supporting the same, a frame member comprising spaced vertical side walls having opposed openings therein for supporting opposite ends of said bar, said frame member being formed to have brackets fixed to the inside surfaces thereof to which the bracket means of said internal combustion engine means is adapted to be secured, and said frame member being formed to have bracket means fixed thereto to which the bracket means of said electric motor means is adapted to be secured.

4. In an industrial truck having a main frame defined by a pair of spaced vertical side walls, differential means, means for supporting the differential means in said main frame, driving wheels adapted to be driven through said differential means, and an internal combustion engine means for driving the differential means, means for mounting said internal combustion engine means between the side walls of said main frame comprising a bar having its opposite ends supported in openings provided therefor in said side walls of said main frame to extend transversely of the latter at one end of said internal combustion engine means and provide a pivotal support therefor about an axis extending horizontally and transversely of said side walls, and resilient bracket means between said main frame and the other end of said internal combustion engine means.

5. A main frame means for an industrial truck or the like having differential means including a housing supported in said main frame with said differential means providing for driving wheels for said truck, and having electric motor means including an electric motor and storage battery means for said electric motor, said electric motor being adapted to be mounted at one end to the housing of said differential means and at its other by resilient bracket means between the electric motor and main frame comprising, a pair of spaced vertical side walls between which and below the upper edges thereof said electric motor is adapted to be disposed, and bracket means carried by said side walls of said main frame to provide for the support of said storage battery means above the upper edges of said side walls.

6. An industrial truck comprising a main frame means having a pair of spaced vertical substantially planar side walls rigidly connected together intermediate their ends in parallel relation by a transversely extending bracing member, differential means including a housing, means including said transverse bracing member for supporting said differential means in said main frame means between said side walls, driving wheels adapted to be driven by said differential means, said truck being adapted to be selectively provided with either an internal combustion engine means or an electric motor means for driving said differential means, said main frame means being formed to provide for the association therewith of means for supporting said internal combustion engine means, said internal combustion engine means being provided with drive shaft means to establish a driving connection with said differential means, said drive shaft means including a cover plate for the housing of said differential means, and said main frame means being formed to provide for the association therewith of bracket means for supporting one end of said electric motor means, with the other end of said electric motor means being adapted to be supported in the end of said differential housing providing for the mounting thereon of said cover plate of said drive shaft means from said internal combustion engine means.

7. In a self-propelled industrial truck having driving wheels and adapted to be provided selectively with either an internal combustion engine means or an electric motor means for driving said driving wheels, and with said internal combustion engine means and said electric motor means having supporting means associated therewith, a main frame member comprising a pair of spaced vertical side walls extending lengthwise of the truck, means at one end of said main frame for supporting a platform upon which the operator of the truck is adapted to stand, a plurality of posts fixed to and extending vertically upwardly of said side walls for supporting hood means to provided an enclosure upwardly of said frame member, a bracing member extending transversely of said walls adjacent the other end of said main frame, differential means including a housing, and having driving axles, means including said bracing member for mounting said differential means between said side walls of said frame member and forwardly of said platform with said axles extending transversely of said main frame and carrying said driving wheels, and said main frame member being adapted to have supporting means associated therewith to cooperate with the supporting means of said internal combustion engine means or said electric motor means for mounting the same selectively between the side walls of said frame member and within the enclosure formed by said hood means.

8. The combination of claim 7 characterized by said electric motor means including an electric motor being formed at one end to be mounted onto the housing of said differential means for supporting the said motor between the side walls of the main frame and below the upper edges thereof, and with said upper edges of said side walls being adapted to be provided with bracket means supporting battery means for the operation of said electric motor of said electric motor means.

9. In a lift truck or the like having driving wheels and adapted to be provided selectively with either an internal combustion engine means or an electric motor means for driving said driving wheels, and a wheeled load supporting frame carrying a load supporting platform, the raising and lowering of which is adapted to be controlled by lift cylinder means connected thereto, the combination of a main frame means comprising, a pair of spaced vertical side walls connected together adjacent one end of the frame by a transversely extending bracing member, differential means including driving axles, means including said bracing member for mounting said differential means between said side walls of said main frame with said axles extending transversely of said frame and carrying said driving wheels, said side walls of said main frame providing for the support of means for cooperation with said supporting means of said internal combustion engine means or said electric motor means for mounting of the same selectively between the side walls of said main frame, and said bracing member having means providing for mounting of said lift cylinder means thereon.

10. In a lift truck or the like having driving wheel means and adapted to be provided selectively with either an internal combustion engine means or an electric motor means for driving said driving wheels in which said internal combustion engine means is provided with supporting bracket means at one end thereof and a supporting bar is provided to extend transversely of the other end thereof, and in which said electric motor means has a housing member at one end thereof and bracket means at the other end thereof, and a wheeled load supporting frame carrying a load supporting platform the raising and lowering of which is adapted to be controlled by lift cylinder means connected thereto, the combination of a main frame means comprising, a pair of spaced vertical side walls connected together adjacent one end of the main frame by a transversely extending bracing member, differential means including a housing and having driving axles, means including said bracing member for mounting said differential means between said side walls of said main frame with said axles extending transversely of said main frame and carrying said driving wheels, said side walls having opposed openings therein for supporting opposite ends of said bar, said main frame means being formed to have brackets fixed to the inside surfaces thereof to which the bracket means of said internal combustion engine is adapted to be secured to provide for the selective mounting of said internal combustion engine means between said side walls, and said main frame means being formed to have bracket means fixed thereto to which the bracket means of said electric motor is adapted to be secured, said differential housing being formed to have said housing member of said electric motor means secured thereto to provide for the selective mounting of said electric motor means between said walls, and said bracing member having means providing for mounting of said lift cylinder means thereon.

ELMER J. DUNHAM.

REFERENCES CITED

The following references are of record in the file of this patent:

UNITED STATES PATENTS

| Number | Name | Date |
|---|---|---|
| 1,248,075 | Carr | Nov. 27, 1917 |
| 1,464,684 | Stoppenbach | Aug. 14, 1923 |
| 1,753,839 | Skelton | Apr. 8, 1930 |
| 1,815,441 | Masury et al. | July 21, 1931 |
| 1,986,134 | Burrows et al. | Jan. 1, 1935 |
| 2,256,314 | Dunham | Sept. 16, 1941 |
| 2,362,129 | Gfrorer | Nov. 7, 1944 |